United States Patent [19]

Holroyd et al.

[11] Patent Number: 4,750,021

[45] Date of Patent: Jun. 7, 1988

[54] APPARATUS FOR PRINTING FROM MICROFILM

[75] Inventors: Bruce A. Holroyd, Fairport; Eugene W. Lachut, Rochester, both of N.Y.

[73] Assignee: Eastman Kodak Company, Rochester, N.Y.

[21] Appl. No.: 41,813

[22] Filed: Apr. 23, 1987

[51] Int. Cl.$^4$ .............................................. G03B 27/52
[52] U.S. Cl. ....................................... 355/41; 355/45; 355/64
[58] Field of Search ...................... 355/41, 40, 5, 7, 45, 355/64

[56] References Cited

U.S. PATENT DOCUMENTS

| | | | |
|---|---|---|---|
| 3,385,161 | 5/1968 | Sage et al. | 355/45 X |
| 4,133,609 | 1/1979 | Arai | 355/7 X |
| 4,582,417 | 4/1986 | Yagasaki et al. | 355/7 |
| 4,623,935 | 11/1986 | Mukai et al. | 355/40 X |

FOREIGN PATENT DOCUMENTS

61/165746 7/1986 Japan .

OTHER PUBLICATIONS

Operator's Manual Kodak IMT-350, Microimage Terminal, p. 23.

Primary Examiner—L. T. Hix
Assistant Examiner—D. Rutledge
Attorney, Agent, or Firm—Norman Rushefsky

[57] ABSTRACT

Apparatus for printing an enlarged reproduction of an image frame stored on a microfilm includes means for measuring the pitch length between the image frame and an adjacent image frame and in response to such measurement produces a signal to inhibit the reproduction of portions of the adjacent image frame on the reproduction.

12 Claims, 8 Drawing Sheets

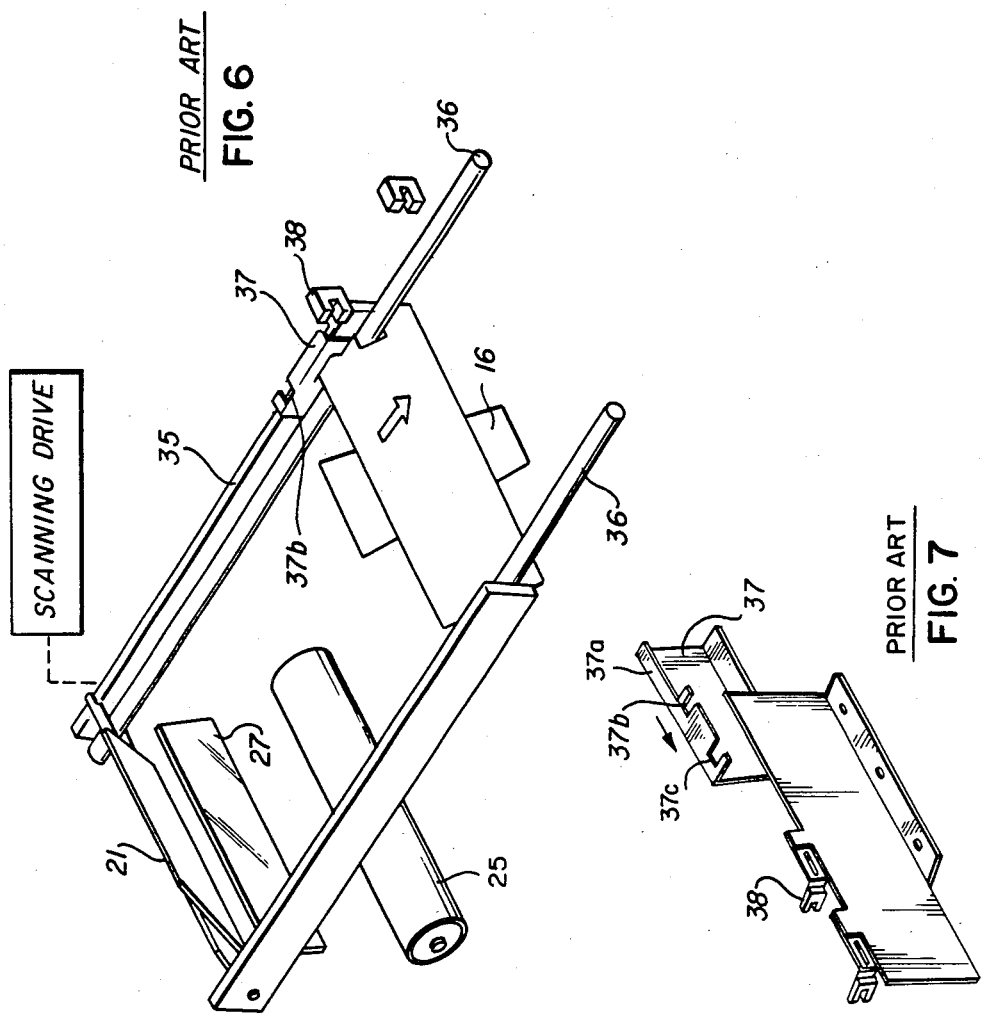

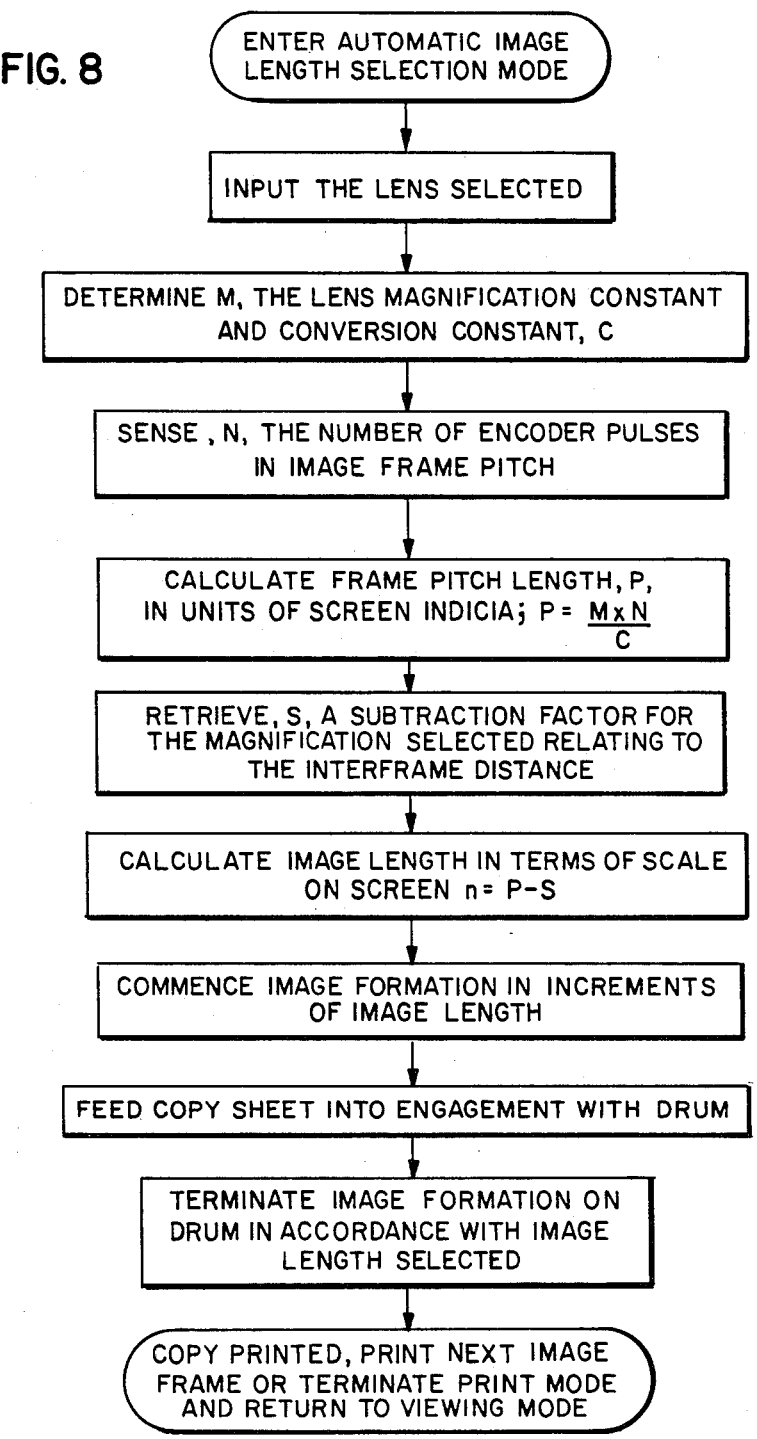

APPARATUS FOR PRINTING FROM MICROFILM

CROSS REFERENCE TO RELATED APPLICATION

This application is related to U.S. application Ser. No. 853,590, filed on Apr. 18, 1986 in the names of Eugene W. Lachut et al and entitled "Reader-Printer Apparatus and Method for Variable Length Copying of Information on a Standard Sheet Length," and to U.S. application Ser. No. 947,456, filed on Dec. 29, 1986, in the names of Bruce A. Holroyd et al and entitled, "Microfilm Printer Apparatus and Method."

BACKGROUND OF THE INVENTION

1. Field of the Invention

This invention relates to apparatus for making enlargements from microfilm.

2. Description of the Prior Art

The practice of using reader-printer apparatus comprising the combination of a copying system and a reader is quite popular. One known reader-printer apparatus is the KODAK IMT-350 Microimage Terminal. This reader-printer apparatus includes means for quickly retrieving a desired image frame stored on a 16 mm microfilm and an optical system for imaging the microfilm image onto a screen during a viewing mode. An electrophotographic reproduction engine is also provided for reproducing enlargements of the microfilm image onto copy sheets such as plain paper. An advantageous feature of this apparatus is that there is the capability for an operator to control reproduction to a selected portion of the image that appears on the viewing screen. Thus, if an image of a projected image frame is of relatively short length it is quite likely that at least a portion of a second image frame will also appear on the screen. The operator can select an image length to be printed by using indicia associated with the screen and suitable buttons to have the reproduction process controlled so that only the image length segment selected for reproduction is reproduced and thereby preclude the reproduction of information on adjacent image frames. While this apparatus works well, a problem with it is that where there are a large number of image frames to be reproduced, extra operator time will be required to designate the image length to be reproduced for each frame.

U.S. Pat. No. 4,623,935 describes an apparatus and method for electronically scanning an image frame on a microfilm for transmission of the signals used in reproducing the image for copying same. The apparatus scans the image frame and detects the black borders surrounding same. The apparatus then electronically deletes the transmission of signals reproducing the black borders to provide copies without black borders. In this apparatus there is a need for circuitry to perform electronic scanning of an image and its borders as well as circuitry for distinguishing image information from border information.

It is, therefore, an object of the invention to provide apparatus for producing enlargements of images stored on microfilm without having images from more than one image frame appear on an enlargement and without the need for the operator to select the image length to be reproduced for each such frame.

It is a further object of the invention to provide apparatus for producing enlargements of images stored on microfilm without the need for providing of circuitry for electronically erasing border areas of the images.

SUMMARY OF THE INVENTION

The above and other objects are achieved in a printing apparatus wherein a control means determines the pitch length between the image frame desired to be reproduced and an adjacent image frame and in response to such determination produces a signal to inhibit reproduction of image areas of the adjacent image frame.

BRIEF DESCRIPTION OF THE DRAWINGS

FIG. 6 is a perspective view of a scanning mirror assembly for use in the apparatus of FIG. 1.

FIG. 7 is a perspective view of a portion of the assembly shown in FIG. 6.

FIG. 8 is a flowchart of a computer program for controlling the apparatus of FIG. 1 in accordance with the invention.

DETAILED DESCRIPTION OF THE PREFERRED EMBODIMENTS

Because reader-printer microfilm apparatus are well known, the present description will be directed in particular to elements forming part of or cooperating more directly with the present invention. Elements of reader-printer apparatus not specifically shown or described herein are selectable from those known in the prior art.

Figure 1:
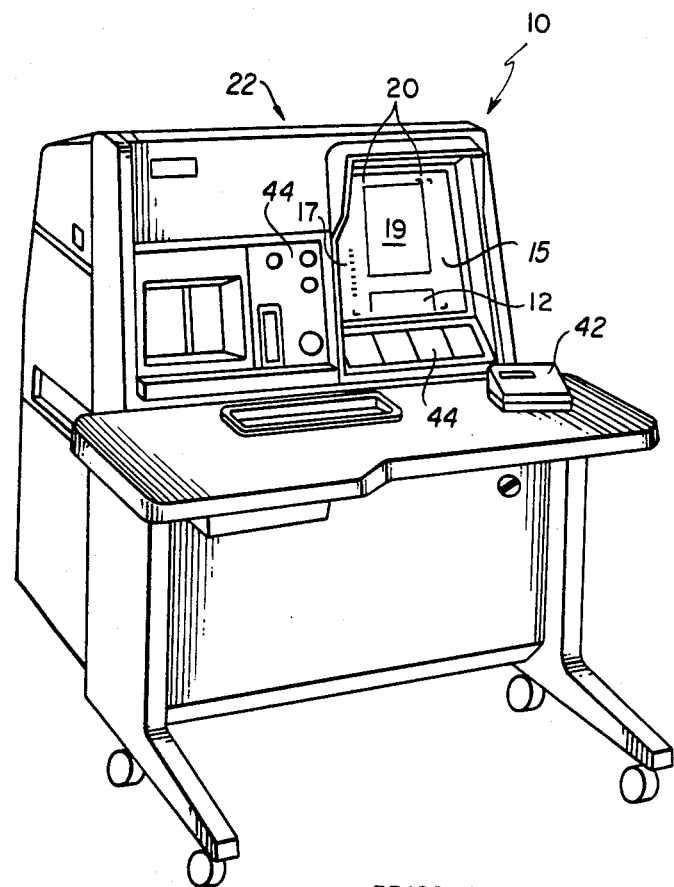
FIG. 1 is an illustration in perspective of a prior art reader-printer apparatus into which the invention may be incorporated.
Figure 2:
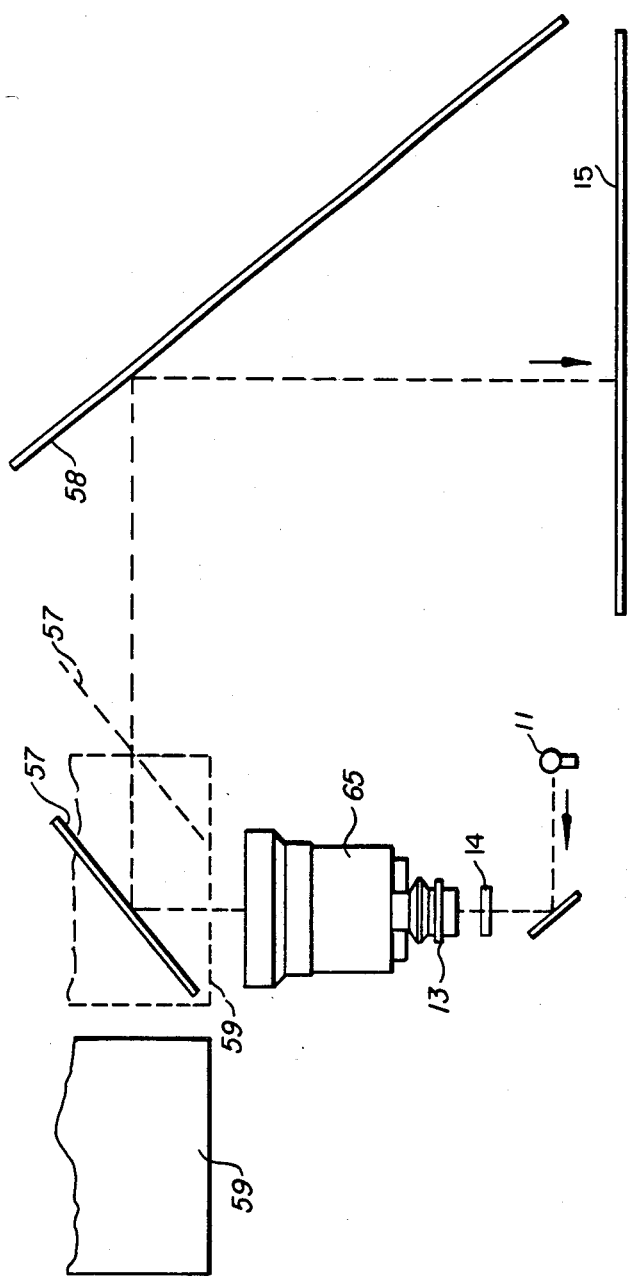
FIG. 2 illustrates a side elevational view of a portion of the apparatus of FIG. 1 when in a viewing or reading mode.
Figure 3:
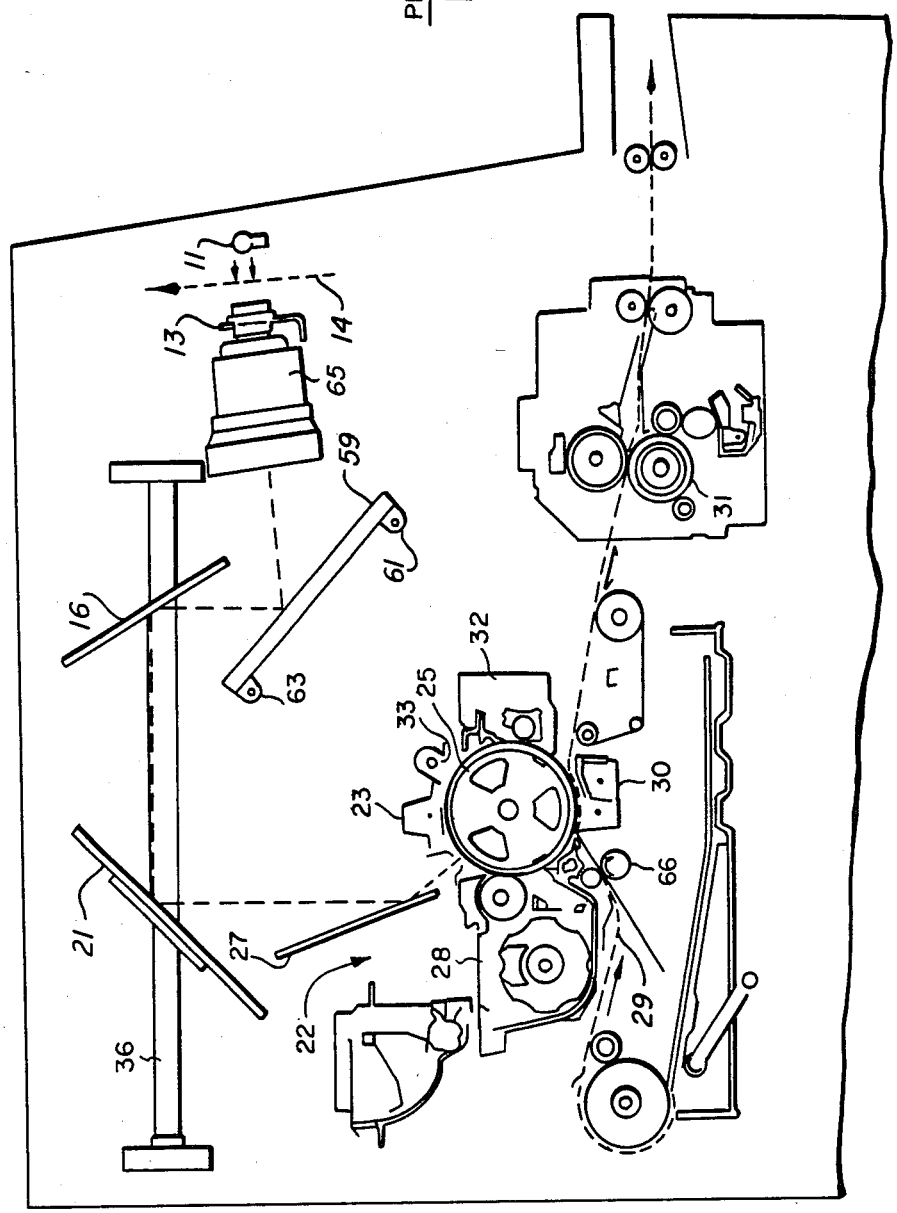
FIG. 3 illustrates a side elevational view of a portion of the apparatus of FIG. 1 but shows the apparatus in a print mode.

With reference now to FIG. 1, a prior art reader-printer apparatus 10 is shown. The apparatus is known as the KODAK IMT-350 Microimage Terminal manufactured by Eastman Kodak Company, Rochester, N.Y. With reference now also to FIGS. 2 and 3, the apparatus 10 includes a projection lamp 11, condenser lens assembly (not shown) and a projection lens 13 and prism 65 for projecting an enlarged image of an image frame on microfilm strip 14 onto a projection screen 15 via mirrors 57 and 58.

Figure 9:
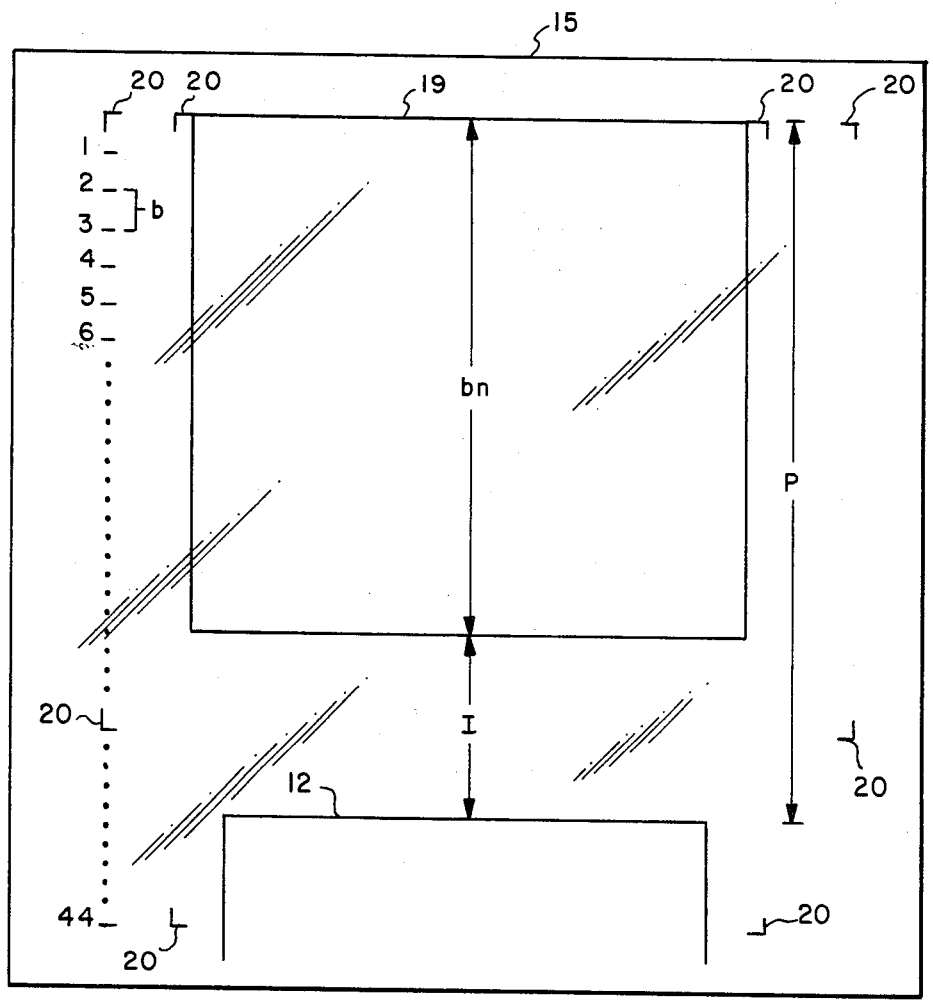
FIG. 9 is a diagram of the viewing screen in the reader-printer apparatus of FIG. 1

During the viewing or reading mode, an image of say a document page stored on the microfilm as an image frame is located in a print gate so that in the viewing mode an image 19 thereof is projected onto the screen with an edge of the image of the document page in alignment with image positioning marks 20 etched on the screen (see FIG. 9). While description will hereinafter be made with reference to the microfilm images appearing as document pages, it should be appreciated that the image may not be of pages but could be of checks or other types of documents. The term "image frame" will be used to broadly describe individual image segments appearing on the microfilm. To produce one or more prints of an individual image frame, a print button is depressed to change the mode of the reader-printer apparatus from the reading mode to a printing mode. In the printing mode, means are provided for moving mirror 57 from the position shown in FIG. 2 in full lines to the position shown in dotted lines so that mirror 59 is now in position to reflect the image of the microfilm image frame in the print gate. Details regarding the structures of mirror assemblies 57 and 59 may be noted in U.S. Pat. No. 4,616,921, the contents of which are incorporated herein. This latter mirror cooperates with mirrors 16 and 21 that form a scanning mirror pair for imaging incrementally an enlarged image 19 of a document page onto a photoconductive drum 25 that is part of an electrophotographic printing engine 22. While description herein will be made with regard to prints formed by an electrophotographic apparatus, other types of reproduction of prints from microfilm may be used.

As known in the prior art, the engine is adapted to be operated in two modes. In the N-P mode, an image of a document that is stored on a microfilm as a negative image is reproduced as a positive image print on a copy sheet. This is accomplished by having a corona charger 23 be electrically coupled to a highly negative electrical power supply to form a corona discharge of negative ions that flow towards the surface of drum 25 as it is rotated. A grid electrode may be electrically biased by a grid power supply to control the voltage level of charge deposited on the drum. During the exposure process, the image 19 of the document page is scanned in increments upon the rotating drum via mirrors 59, 16, 21 and 27 to form a latent electrostatic image of the document page. The latent image is developed as the drum rotates past a development station 28 wherein negatively charged electroscopic toner is selectively attracted to areas of the drum which have been exposed to imaging radiation passing through the microfilm image of the document page to form a visible image. The developed image on the drum is then transferred to a copy sheet 29 of say plain paper by advancing the copy sheet so that a leading edge thereof is moved into engagement with the drum in synchronism with the edge of the developed image of the document page. The copy sheets may be stored as discrete sheets of standard size in a cassette located below the drum 25. As segments of the copy sheet are continuously moved into engagement with the drum, an image transfer corona charger 30 applies a positive charge to the backside of the sheet. As each sheet segment leaves contact with the drum the negatively charged toner remains attracted to the sheet and the image is thus transferred to the sheet. The sheet is then passed between a pair of fusing rollers 31 to fix the toner to the sheet. The drum is then rotated past a cleaning station 32 wherein residual toner not transferred to the sheet is removed. An erase lamp 33 is illuminated to erase charge from the drum prior to forming the next copy.

In the P-P mode, an image of the document page that is stored on a microfilm as a positive image is reproduced as a positive image on a copy sheet. In this mode corona charger 23 is coupled to a positive electrical power supply and deposits a positive charge on the drum whose potential level is controlled by a grid electrode coupled to a suitable power supply. As the drum rotates it is exposed to the image of the document page and an electrostatic latent image is formed on the surface. The latent image is developed with the negatively charged electroscopic toner and transferred and fixed to a copy sheet as described above.

Figure 5:
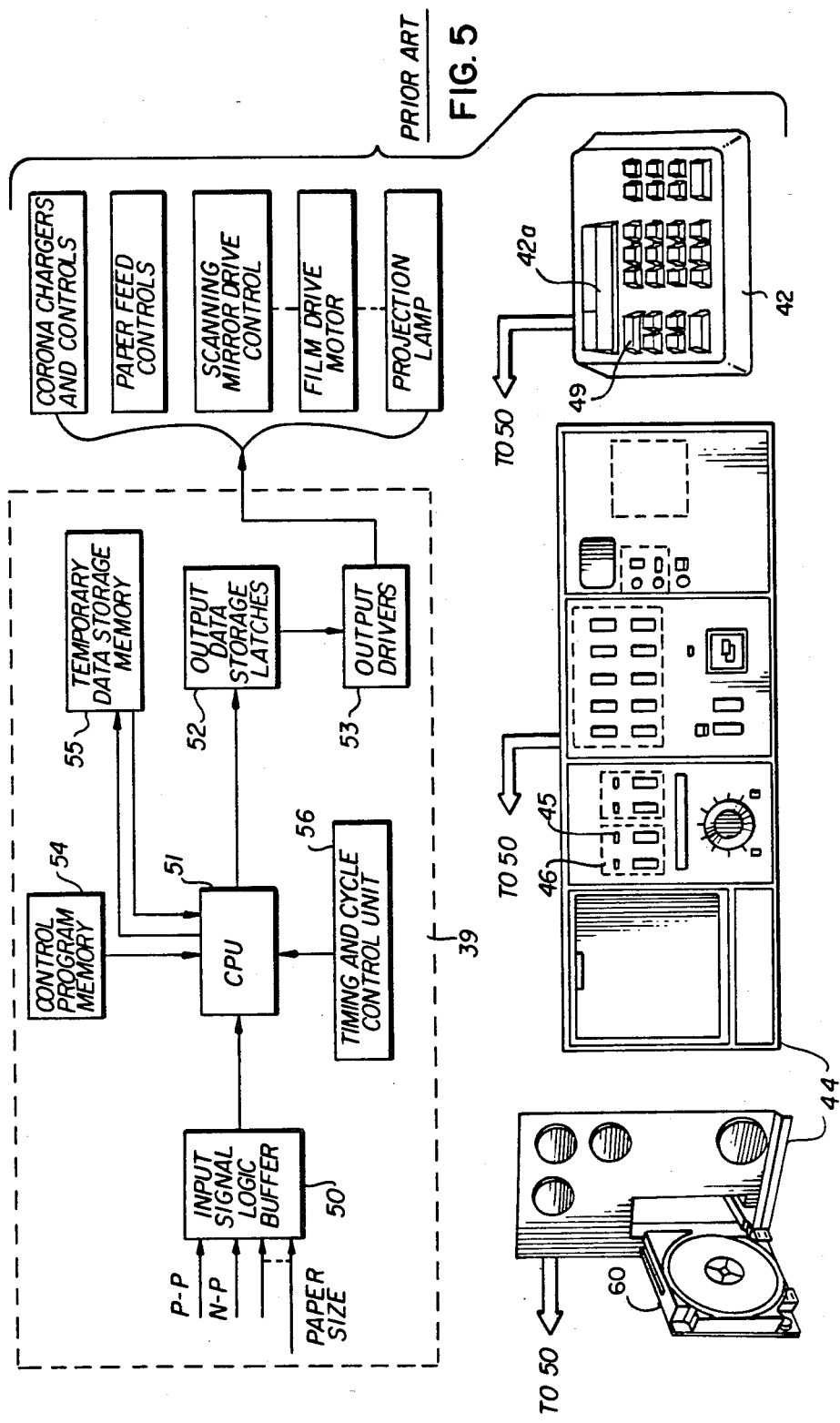
FIG. 5 is a schematic of a control system for controlling the apparatus of FIG. 1.

With reference now to FIG. 5, a control panel 44 is shown forming a part of the prior art apparatus 10 and which includes P-P and N-P mode buttons 45, 46 and various other control buttons to control exposure, etc. A slot is provided in the control panel for receiving a magazine 60 having a supply of microimages formed on a strip of microfilm. The apparatus includes controls for automatically threading the strip into a film drive when the magazine is inserted into the slot. A keyboard 42 is also provided and includes various control buttons and alphanumeric display 42a. Inputs from the various control buttons are applied through input signal logic buffer 50 of the reader-printer's logic and control unit (LCU) 39. The input signals to signal buffer 50 consist of logic level digital signals which may be stored in a temporary data storage memory 55 in the microprocessor based LCU. Output data for controlling the apparatus are provided by the LCU with output data storage latches 52 and output drivers 53. The drivers in turn directly control operation of the apparatus' components such as motor(s), clutches, solenoids, power switches, lamps, chargers and various displays. The LCU's processing functions can be programmed by changing instructions stored in the computer's control program memory 54. The LCU also includes a central processing unit 51 and timing and cycle control unit means 56.

Figure 4:
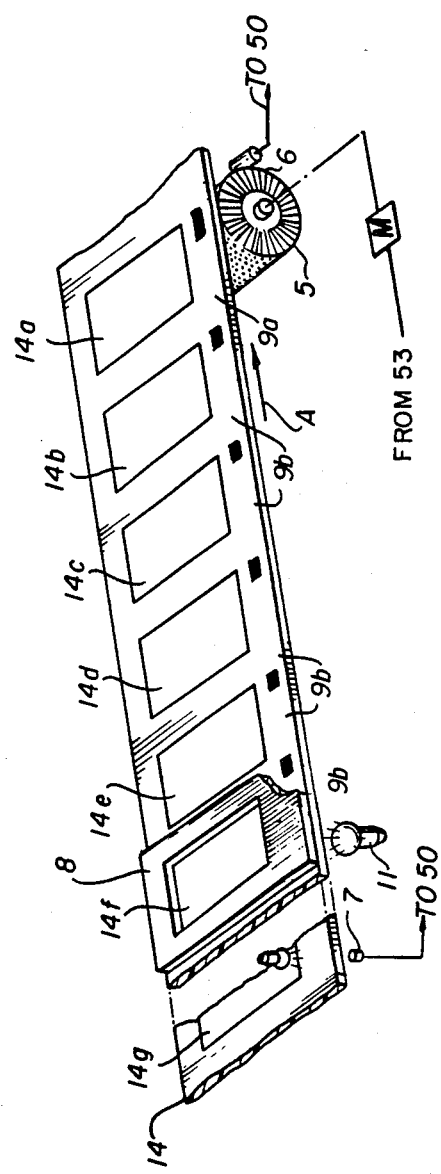
FIG. 4 is a schematic of a microfilm strip transported in the apparatus of FIG. 1 and illustrates certain structure in the apparatus for cooperation with the strip.

With reference now to FIG. 4, it may be noted that each of the image frames 14a-14g of microfilm strip 14 has adjacent thereto an indicium (9a, 9b), such as a black mark, located near the leading edge of the frame. It will be noted that image frame 14a has an indicium 9a that is larger than the other frames shown. This larger indicium may be used to designate this frame as a chapter head of its respective chapter of image document pages. Within the group of pages 14a-14f are a related set of documents that have been designated as such during the production of the microfilm. An edge of each indicium is located in alignment with the leading edge of its respective image frame. The image frame leading edge is oriented on the strip 14 in a direction perpendicular to the direction of advancement of the strip. As is conventional in apparatus of this type, a motor M is provided to rotate a drive roller 5 to advance a desired image frame into a print gate 8 wherein it is positioned for viewing on the screen 15 or for printing as described above. As noted above, the microfilm is preferably stored within a conventional magazine having an appropriate supply spool. A take-up spool may be provided as part of the apparatus and the film is payed out from supply to take-up by advancing the film in the direction of the arrow A. The motor M is operated by the LCU and precise location of the image frame in the film gate is accomplished by the use of an indicia sensor 7, which may be a photoelectric device, that is adapted to provide a pulse to the LCU for each indicium sensed. In the prior art apparatus referred to this sensor will be located several image frames upstream of the print gate 8. An encoder 6 is incorporated in one of the drive rollers for providing pulses to the LCU for each small increment of advancement of the film strip. Since a chapter head indicium 9a is larger than indicia for other pages of that chapter, the duration of a pulse for which the chapter head indicium is sensed by the photosensor is larger and denotes to the LCU that a chapter head page image frame is on the film. Also, it will be understood that in the prior art apparatus as the microfilm strip is advanced, information has been provided to the LCU and is stored in table form in the temporary memory 55 as to the type of image frames that are present between the sensor 7 and the print gate and the distances or pitches between adjacent image frames. These signals are provided by the signals from encoder 6 and indicia sensor 7 and are used by the LCU to calculate when a selected image frame is precisely located in the print gate 8.

The invention will now be described in accordance with the automatic printing of image frames forming a chapter in accordance with the procedure disclosed in the aforementioned U.S. Ser. No. 947,456. Assume that the operator, either manually or through a conventional computer-aided-retrieval device, has located in the print gate a chapter head image frame of a chapter for which a set of copies are desired. After inputting exposure information including whether the N-P or P-P mode is needed by pressing the appropriate buttons including buttons 45, 46, the operator inputs a number comprising the number of copies of the chapter pages that are desired. This is input using keyboard 42. The number may be any number from one to 99 and such number will be displayed in display 42a associated with this keyboard. Next, the operator presses the * button which is one of the buttons on the keyboard 42 and which is used to designate the multiple copy mode program stored in control program memory 54. It will be appreciated that other conventional input controls are associated with keyboard 42 such as for allowing the operator to advance the microfilm to the desired image frame by designating the location of the frame number and having the drive to the microfilm automatically search for that frame through counting of the indicia at the edge of each frame. Other controls are associated with control panel 44 for allowing the operator to manually search for this frame using the reader's viewing screen. Also input at this time through the keyboard 42 is a code for calling up an automatic image length selection mode. Upon actuation of the Print Command button 49 the number of copies input is stored in a counter associated with temporary memory 55. If it is determined by signals stored in temporary memory 55 that the image frame 14a in the print gate is a chapter head or chapter boundary the LCU 39 actuates the film drive motor M through signals from the CPU 51, output data storage latches 52 and output drivers 53. The motor M moves the microfilm strip in the direction of arrow A until the last frame, 14f, in the very same chapter is located in the print gate. This last image frame is determined since the next image frame adjacent it (image frame 14g) is a chapter head or chapter boundary frame for the next chapter. The location of this last image frame 14f was sensed by sensor 7 and its location stored in temporary memory 55 when the microfilm strip was advanced to place frame 14a in the print gate if this is a short chapter. If this chapter is relatively long with respect to the distance between sensor 7 and the print gate, this image frame 14f would be sensed by sensor 7 as the microfilm is advanced to place frame 14f in the print gate and its location stored in temporary memory 55.

In searching for the last image frame of the chapter the LCU first searches the temporary memory 55 to determine if the last image frame of the chapter has passed the sensor 7. If it has it is a short chapter and the information in this memory is used to locate the image frame 14f in the print gate. If the last frame of the chapter has not passed the image sensor the microfilm strip is advanced as indicated above for relatively long chapters. The LCU is provided in temporary memory 55 with a counter register that stores the location of frame 14f relative to chapter head frame 14a. This register is decremented or incremented each time the strip moves one image frame. When this counter register reaches zero, the chapter head 14a is in the print gate and when it reaches the number originally stored in the register, the last page of the chapter image frame 14f, is in the print gate.

With the image frame 14f now moved into the print gate this frame is printed in accordance with the operation described above and the procedure indicated below and the print or copy sheet 29 delivered face-up to an output tray (not shown). Of course, conventional means may be provided for permitting for exposure adjustments during setup of this print job.

Description will now be provided with reference to the flowchart shown in FIG. 8. Programming of minicomputers or microprocessors is a conventional skill well understood in the art. The disclosure provided herein is written to enable a programmer having ordinary skill in the art to produce an appropriate program for the computer. The particular details of any such program would, of course, depend upon the architecture of the selected computer.

With image frame 14f in the print gate conventional means may be used to provide signals to input signal buffer 50 as to which one of several available lens magnifications is being used. This means may take the form of switches or a rheostat calibrated to provide preassigned signal information when one of a group of lenses is shifted into the optical path of the reader-printer. Alternatively, the operator may input via a keyboard entry a code to choose the desired lens and the information concerning lens magnification selected is provided as a signal to the LCU through this entry. The information concerning lens magnification of the lens concurrently in use is stored in the LCU's memory to eliminate the need for the operator to repeatedly identify same. When this signal is "read" by the LCU 39, the CPU in association with a formula stored in control program memory 54 calculates and stores in temporary memory 55 a value M which is the lens magnification constant for the lens now in the optical path. In lieu of calculating M, a look-up table may be programmed in memory 54 to provide M in response to signals indicating which lens magnification has been selected.

As indicated above, as an image frame is moved toward the print gate, the encoder wheel provides a pulse to input signal logic buffer 50 for each incremental advancement of the frame. These pulses are counted by the LCU beginning with when the frame's indicium is sensed and terminating when the indicium of the next image frame is sensed. This effectively determines the pitch length of the image frame. Assume that image frame 14f shown in FIG. 4 is a relatively short image frame and that its image 19 projected on screen 15 in FIGS. 1 and 9 does not fill the screen 15. This will cause a portion of adjacent image frame 14g to also be visible as image 12 on screen 15 and this portion of image frame 14g will be prevented automatically from being reproduced by the apparatus and method of the invention. After the number of encoder pulses, N, are counted, the LCU calculates the frame pitch length, P, of frame 14f by multiplying the lens magnification constant M by the number N. P represents the distance on the screen 15 between the top frame line of image 19 and the top frame line of image 12.

As may be noted in FIG. 9, the screen 15 includes a series of uniformly spaced (b=0.25 inches or 0.635 cm apart) etched ruler-like fiducial marks formed to one side of the projected image frame. Adjacent each or alternate marks is a number selected from 1 to 44 (only 1-6 and 44 are illustrated in the drawing). The mark closest to the top frame line of image 19 is designated as number 1 and that furthest from this frame line is number 44. These marks are in numerical order and thus represent progressive distances from the top frame line. In the prior art reader-printer apparatus referred to herein, an operator may produce a copy of image 19 by noting the number of the mark that is closest to the bottom image frame line of image 19 by keying this number into the apparatus' LCU to control image length reproduction. In the apparatus of the invention, the image length of image 19 is automatically calculated in terms of the numbers associated with the ruler-like marks. This is done in the LCU by dividing the pitch length, P, by a conversion constant, C, that is also stored in control program memory, and then subtracting from the quotient an appropriate factor "S" to be described and which relates to interframe distance, I. The calculated value, "n", is now compared with the operator selectable discrete image lengths stored in memory, i.e., numbers 1 through 44 to determine which is closest or provides the best fit.

The factor, "S", is determined by noting that in producing the microfilm strip from document originals, it is conventional to provide a minimum interframe distance between adjacent image frames formed on the microfilm strip. This factor, "S", can also be stored in table memory for each lens magnification that may be selected. Alternatively, as an approximation, the same value for "S" may be used for all the lens magnifications selectable. Thus, "n" is now determined using the following equation:

$$n = \frac{P}{C} - S$$

In an example illustrating the use of the invention, assume that the lens size selected for reproduction of a particular image frame is 43X. The image as projected on the screen is assumed to be 5½ inches (14 cm). For this lens, the lens magnification constant, M, is 291 and the conversion constant, C, is 512 and both are stored in table memory in control program memory 54. In this example, a conversion constant of 512 is chosen to facilitate the division operation by the LCU and the magnification constant, M, is adjusted accordingly. The LCU 39 in this example might count 41 encoder pulses between the indicium associated with this image frame and that associated with the adjacent image frame upstream thereto. The pitch length, P, is thus calculated by multiplying 41×291 and dividing this product by 512 to equal 23.3. Assume for this lens magnification size, the subtraction factor, S, that is stored in table memory is 1. The LCU's computer subtracts 1 from 23 to determine that n=22.

With the image length, "n" now determined printing commences by the printing operation described above wherein increments of the image 19 starting with the top image frame line are scanned onto the charged photoconductive drum 25. The projection lamp 11 is turned on and the scanning mirrors 16 and 21 are moved towards the right as viewed in FIG. 3. Since the topmost portion of the document page is formed first on the drum 25 the corona charger 23 and the projection lamp 11 will be turned on prior in time to movement of the copy sheet 29 into engagement with the drum 25. The polarity of the corona charger 23 will, of course, be determined by the mode instructed by the operator for either N-P or P-P operation. Operation of the corona charger and projection lamp may be in response to and a short time period after movement of mirror 59 into its print position. Mirrors 16 and 21 are supported on a carriage for movement along a pair of parallel horizontal rails 36. As the scanning mirrors 16 and 21 begin to move to the right as viewed in FIG. 3, the reed switch 38 (FIGS. 6 and 7) is actuated by the flange 37a on bracket 37. Actuation of this switch is used to also activate a solenoid actuated clutch (not shown) in the paper supply synchronizing rollers 66 to advance a copy sheet into engagement with the drum in synchronism with the developed image of the top edge of the document page. As the bracket 37 (and scanning mirrors) move further in the direction of the arrow in FIG. 6 the notch 37c is sensed and commences the timing by the LCU of a predetermined time period. At the end of this time period the LCU issues signals to terminate or inhibits image formation on the drum dependent upon the image length calculated. The sensing of the notch 37c by reed switch 38 may be used to terminate directly image formation for the shortest length calculated (i.e., when line number 1 on the screen is the calculated length). Where longer lengths of image information are calculated for reproduction the notch is used as a reference to begin a count based upon a timetable in the logic and control unit's program memory to terminate image formation at a time corresponding to that when latent electrostatic image formation for information situated below the line selected would otherwise be formed on the drum.

In lieu of using indicators such as a bracket with notches that move with the scanning mirrors, timing may be provided by having the LCU commence a count from the time of commencement of movement of the mirrors to the right and either calculate or compare this count with values in a table memory associating the count with position of the information being scanned and portions of the drum being charged and exposed. Alternatively, a hybrid of the above two alternatives may be used wherein the LCU provides the count until the reference notch is sensed and such sensing causes a new count to commence.

While use of the notch 37c has been discussed herein as the reference for use in control of timing of the described operations, in actuality the edges of the notch are to be used as the synchronizing points. The first edge of the notch encountered by switch 38 is used as a reference for terminating a P-P image by turning off the corona charger 23. The second edge encountered is used as a reference to terminate an N-P image by turning off the projection lamp 11. The point of projection of an image upon the drum and the point of application of the corona are 1.2 inches (3.0 cm) apart. The notch 37c which moves at one-half the speed of the drum is made 0.6 inches (1.5 cm) wide so that the synchronizing edges of the notch terminate respective operations at an equivalent point on the drum. In the P-P mode it is also preferred to turn off the projection lamp 11 when the point on the drum which was beneath the corona charger 23 when charging was terminated, reaches the drum's image projection station.

With the charger and or projection lamp shut off at the point on the drum where no further imaging is desired the reproduction on the copy is provided with only the image information on image frame 19 and with no toner or coloration of the remaining portion of the document. Even though corona charging has been terminated from charger 23 and/or the projection lamp 11 turned off, the movement of the scanning mirrors continues and notch 37b will be sensed and used to control other components of the apparatus by setting of the various timer routines so that the reproduction engine completes its cycle. Notch 37b thus is used to enable timer routines to continue completion of the engine cycle.

The LCU now, after printing of image frame 14f, operates the motor M to advance the microfilm strip one image frame to print image frame 14e in accordance with the procedure described above and this step is repeated until the chapter head image frame 14a is printed. This provides one collated set of prints of the chapter, as the prints are in the order of chapter head page first with the last page last and the other pages in the stack in their relative order on the microfilm. A second set of collated prints is made by repeating the above steps. The LCU in response to the completion of printing of the chapter head 14a provides signals to motor M to automatically advance the microfilm strip to once again place the last frame 14f in the print gate and to commence the second set of prints. Subsequent sets of prints are made until the number of sets tallied in a counter in the LCU is zero at which time the printer stops and the chapter head image frame is located in the print gate and viewable on reader screen 15.

Thus, a reader-printer apparatus is disclosed having the capability of automatically reproducing image frames of varying image length stored on a microfilm and wherein images on adjacent image frames may be automatically inhibited from being reproduced on the reproductions without the need for the operator to determine the image length.

Improved reproduction quality may be provided for controlling exposure duration not only in response to the operator's image length selection but also in response to lamp brightness which may be quantified by a factor, such as lamp voltage or power, which relates to lamp brightness. Controls may be provided to overcome the problem of the brightness of the projection lamp affecting how quickly the lamp can be turned off; i.e., quenched. The controls also may include an automatic exposure control for making prints. In the prior art reader-printer of FIG. 1, a circuit board is provided that includes a number, say eleven, of spaced photocells located thereon. If the automatic exposure button on the operator's control panel 44 is pressed prior to making a print, the brightness of the projection lamp 11 during the print mode is controlled in accordance with a reading made of light sensed by these photocells. This light is, of course, light that has been projected through the microform image frame or a major central portion thereof. When the print button 49 is pressed, the viewing mode ends and the projection lamp turns off. Mirror 57 moves out of the way to allow mirrors 16 and 21 to move to the left in FIG. 3 to a scan start position. Just before the mirrors 16 and 21 reach the scan start position, the projection lamp 11 is again illuminated. Light therefrom is modulated by the microform image which previously was projected onto the image screen and is now projected onto the photocells. The output of each photocell is proportional to the image light falling thereon and may be quantized by conventional circuitry. A reading from each photocell is sent to the reader-printer's logic and control unit where, for example, the highest and lowest light level readings may be averaged to control the brightness of the projection lamp such as by controlling the voltage or power thereto. When this adjustment is made, the print mode begins by moving the scan mirrors 16, 21 to the right in FIG. 3. In a manual exposure mode, the operator adjusts a dial to control the brightness of the projection lamp desired and presses the manual exposure button.

In an automatic exposure mode, the projection lamp is turned back on and illuminates all the photocells. Since the LCU has determined that only a portion of the projected image is to be reproduced; i.e., that of image 19 while that of image 20 is to be inhibited from being reproduced, the CPU is instructed by the control program memory 54 to consider only the photocells receiving light from the image frame associated with image 19. Thus, of the total of eleven photocells perhaps only six or eight are so located on the circuit board as to receive light from that passing through the microfilm image frame producing the image 19. In this case, only the readings from these six or eight photocells will be used by the CPU to automatically control exposure, i.e., the brightness of the projection lamp 11. This may be done using the same algorithm of say looking at the highest and lowest readings between, in this case, just the six or eight photocells and averaging the high and low readings. Since line voltage to the lamp's power supply affects lamp brightness, controls including an A/D converter are preferably provided to read this voltage and use the LCU 39 to adjust power or voltage to the projection lamp accordingly using a thyristor gate control which comprises a part of the lamp's power supply. With the projection lamp brightness adjusted in accordance with the appropriate requirements for automatic exposure of the image portion selected for reproduction, the scan mirrors 16, 21 are moved from left to right and an incremental exposure of the image of a document page is made starting with the top portion of the image. With the calculation of lamp brightness for automatic exposure or the calculations of lamp brightness for the specific manual exposure setting, a further determination is made concerning adjustments of lamp turn-off time with regard to the brightness thereof during the exposure mode. A "look-up" table in control program memory 54 can provide predetermined adjustments to turn-off time for various projection lamp voltage readings. Thus, the timer routines described previously and used to control operation of the corona charger 23 and projection lamp 11 in accordance with image length selected are provided with a minor adjustment to such timing to account for the time say a relatively bright bulb takes to completely become extinguished. Signals from the LCU output drivers 53, acting through the thyristor control, control power or voltage to the projection lamp 11 for the time period determined in accordance with the aforementioned factors. If desired, a "closed-loop" control system may be provided wherein lamp brightness may be determined by sensing same directly using a photocell that "sees" light directly from the lamp that has not been modulated by image information.

The invention has been described in detail with particular reference to preferred embodiments thereof, but it will be understood that variations and modifications can be effected within the spirit and scope of the invention.

We claim:

1. In an apparatus for printing enlargements of image frames stored on a microfilm, the apparatus including means for advancing the microfilm into a print station, reproducing means for forming an enlargement of one image frame upon a copy sheet of a size not substantially dependent upon the pitch length of the image frame, the improvement which comprises:

control means for determining the pitch length between adjacent image frames and in response to such a determination producing a signal to inhibit said reproducing means from reproducing image areas of an image frame adjacent to said one image frame.

2. The apparatus of claim 1 and wherein the control means includes sensing means for sensing an indicium associated with each frame.

3. The apparatus of claim 2 and wherein the sensing means is located relative to the microfilm to sense indicia external to the image frames.

4. The printer apparatus of claim 1, 2 or 3 and wherein the reproducing means includes a photoconductive surface; means for moving the surface relative to stations performing operations on the surface; charge providing means for producing a uniform electrostatic charge upon the surface as the surface is being moved relative thereto; illumination means for exposing onto the surface light that has been modulated by incremental segments of information on the image frame selected for reproduction to form an electrostatic image of the information; means for developing the electrostatic image; and means for transferring the developed image to the copy sheet.

5. The apparatus of claim 4 and including means for storing data related to a minimum interframe distance between image frames; means for producing a signal related to the distance between corresponding portions on said one image frame and the said image frame adjacent thereto less the minimum interframe distance; and said reproducing means inhibits said exposure means in response to said signal.

6. The apparatus of claim 5 and wherein the reproducing means inhibits said charging means in response to said signal.

7. The apparatus of claim 6 in combination with a microfilm viewer apparatus, the viewer apparatus including a screen and means for projecting an enlarged image of an image frame upon the screen.

8. The apparatus of claim 5 in combination with a microfilm viewer apparatus, the viewer apparatus including a screen and means for projecting an enlarged image of an image frame upon the screen.

9. The apparatus of claim 4 in combination with a microfilm viewer apparatus, the viewer apparatus including a screen and means for projecting an enlarged image of an image frame upon the screen.

10. The apparatus of claim 9 and including means for enabling an operator to select for reproduction an image length portion of an image frame projected on said screen in accordance with indicia associated with said screen.

11. In an apparatus for viewing and printing enlargements of image frames stored on microfilm, the apparatus including means for advancing the microfilm into a print station, means for projecting an image of the microfilm on a viewing screen, reproducing means for forming an enlargement of one image frame upon a copy sheet, the improvement which comprises:

control means for calculating the length of the image frame and in response to such calculation producing a signal to inhibit said reproducing means from reproducing image areas of an image frame adjacent to said one image frame.

12. The apparatus of claim 10 and including means for storing data related to a minimum interframe distance between image frames; and means for producing a signal related to the distance between corresponding portions of said one image frame and the said image frame adjacent thereto less the minimum interframe distance.

* * * * *